N. C. MILLER.
APPARATUS FOR UNLOADING HAY AND OTHER MATERIAL.
APPLICATION FILED JUNE 29, 1910.
1,003,286.
Patented Sept. 12, 1911.
3 SHEETS—SHEET 2.
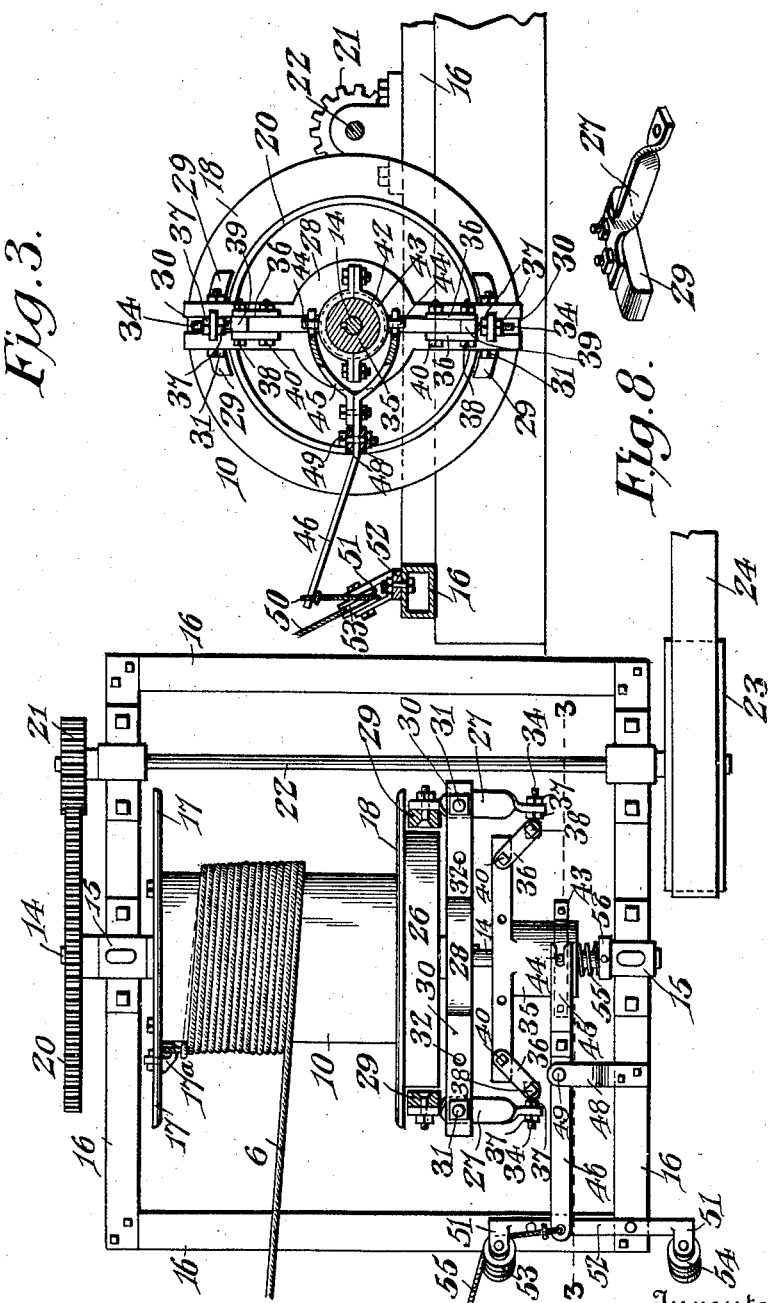
Witnesses
Jas. F. McCuthman
W. F. Riley
Inventor
Nicholas C. Miller,
By
E. G. Siggers
Attorney N. C. MILLER.
APPARATUS FOR UNLOADING HAY AND OTHER MATERIAL.
APPLICATION FILED JUNE 29, 1910.
1,003,286.
Patented Sept. 12, 1911.
3 SHEETS—SHEET 3.
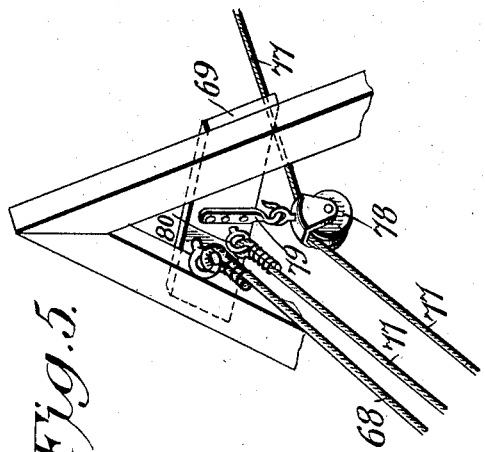
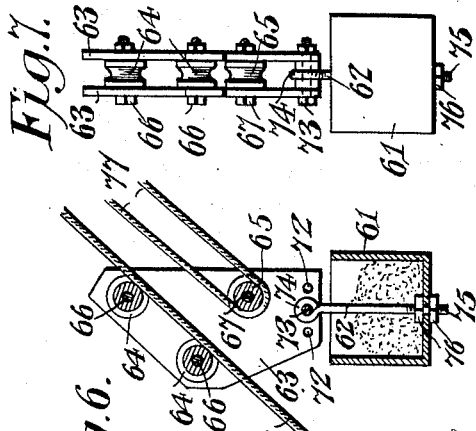
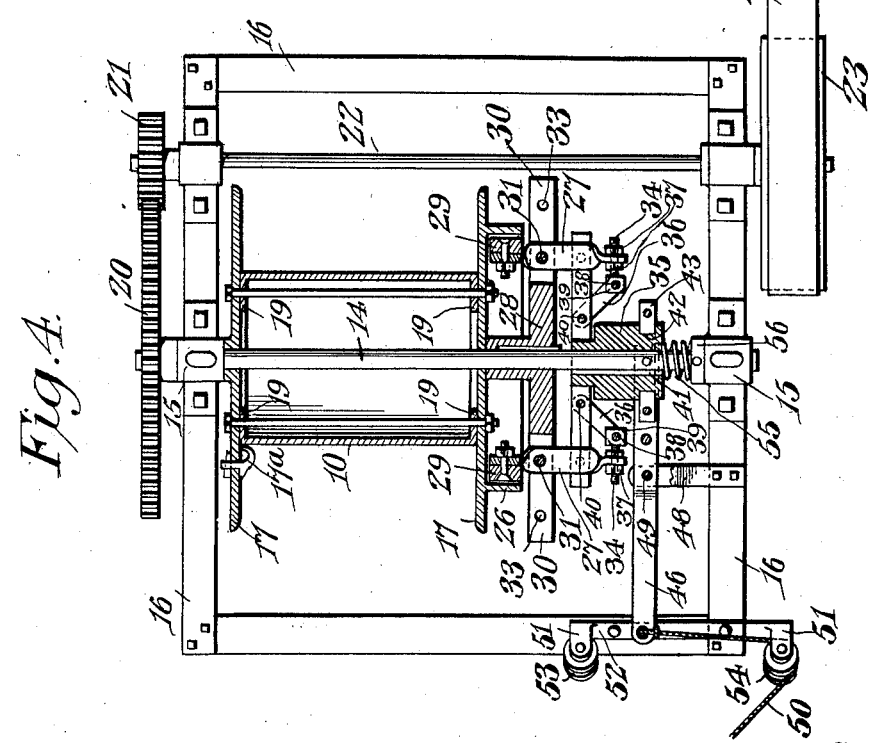
Nicholas C. Miller, Inventor
Witnesses
By
Attorney

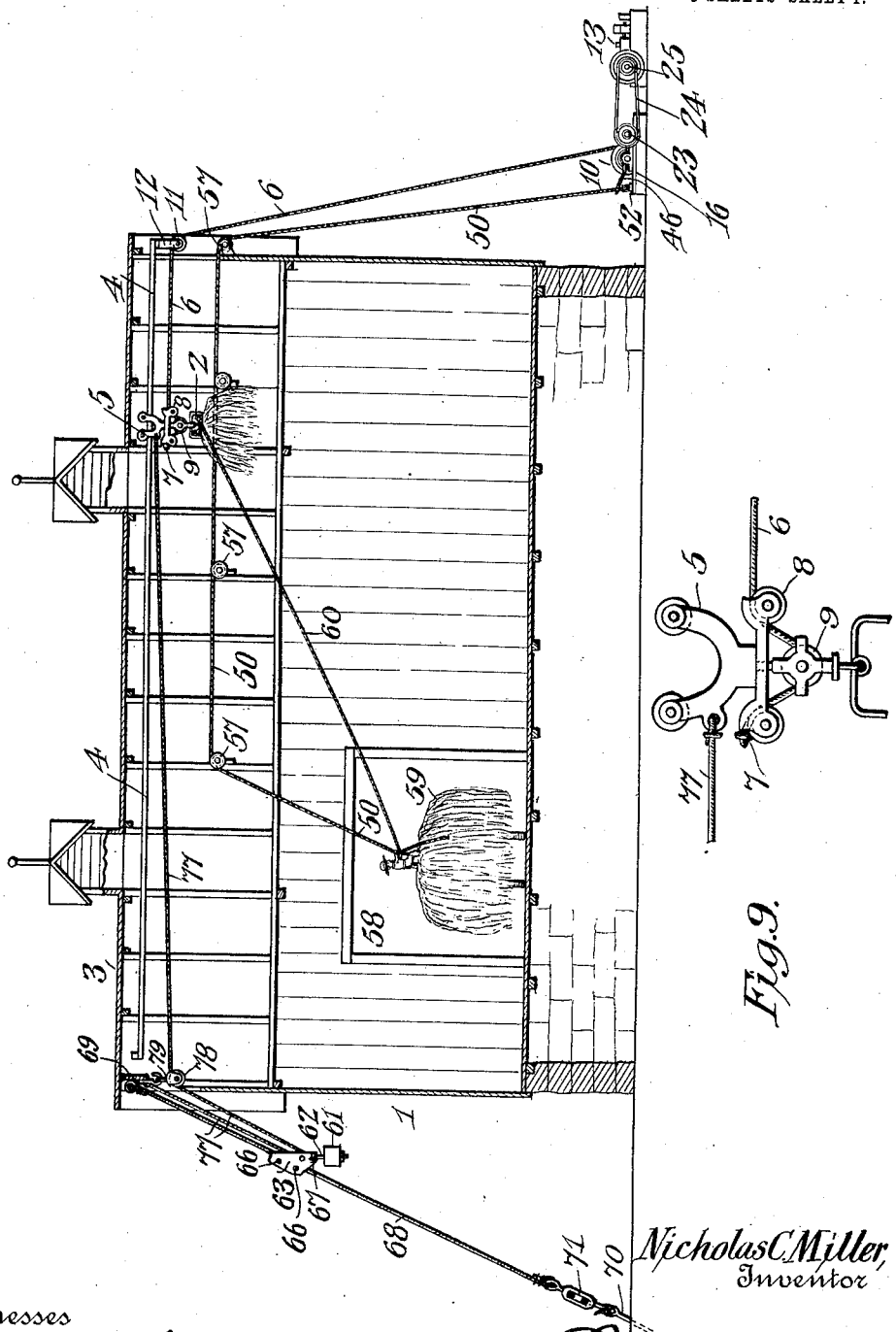

UNITED STATES PATENT OFFICE.

NICHOLAS C. MILLER, OF DODGEVILLE, WISCONSIN.

APPARATUS FOR UNLOADING HAY AND OTHER MATERIAL.

1,003,286.  Specification of Letters Patent.  Patented Sept. 12, 1911.

Application filed June 29, 1910. Serial No. 569,565.

*To all whom it may concern:*

Be it known that I, NICHOLAS C. MILLER, a citizen of the United States, residing at Dodgeville, in the county of Iowa and State of Wisconsin, have invented a new and useful Apparatus for Unloading Hay and other Material, of which the following is a specification.

The invention relates to an apparatus for unloading hay and other material.

The object of the present invention is to provide a simple, inexpensive and efficient apparatus, designed particularly for unloading hay in barns, sheds, or other inclosures, and adapted to dispense with the use of horses and the extra man usually employed to drive the same and carry back the rope and doubletree, and capable of effecting a great saving in both time and labor and of relieving the operator of all weight.

Another object of the invention is to provide an unloading apparatus of this character, adapted to be readily applied to a barn or shed, and equipped with exteriorly arranged motor actuated hoisting mechanism, adapted to be controlled by a person within the barn or shed and on the load of hay.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a longitudinal sectional view of an unloading apparatus, constructed in accordance with this invention, and shown applied to a barn. Fig. 2 is a plan view, partly in section, of the hoisting device, the clutch lever being arranged to grip the outer face of the rim or flange of the drum. Fig. 3 is a vertical sectional view of the same on the line 3—3 of Fig. 2. Fig. 4 is a horizontal sectional view of the hoisting device, the clutch levers being arranged to engage the inner face of the rim or flange of the drum. Fig. 5 is a detail perspective view of a portion of the hoisting rope and the inclined track. Fig. 6 is a vertical sectional view of the hoisting device. Fig. 7 is an end elevation of the same. Fig. 8 is a detail perspective view of one of the clutch levers. Fig. 9 is an enlarged detail view, illustrating the manner of connecting the hay fork with the carrier.

Like numerals of reference designate corresponding parts in all the figures of the drawings.

In the embodiment of the invention illustrated in the accompanying drawings, the unloading apparatus is shown applied to a barn 1 of the ordinary construction, but it is equally applicable to various styles of barns, sheds, or other shelters in which hay is stored, and it is adapted to be also employed for handling various material whether carried by a hay fork 2, or a receptacle, or any other holding means. Within the barn 1 beneath the peak of the roof 3 is arranged a horizontal carrier track 4, extending longitudinally of the barn from one end to the other, as clearly shown in Fig. 1 of the drawings, and receiving a carrier 5. The carrier 5, which is movable along the track from one end to the other thereof, is of the ordinary construction, and is adapted to support the hay fork 2. The hay fork is suspended from the carrier 5 by means of a hoisting rope 6, secured at its end 7 to the carrier and looped between its attaching end and a pulley 8 to receive the hay fork, which is equipped with a pulley 9. The hoisting rope 6 extends from the carrier to one end of the barn, then to a hoisting drum 10, being guided at the end of the barn by a pulley 11, mounted at one end of the track 4 in a suitable hanger 12.

The hoisting drum, which is actuated by a gasolene engine 13, or other suitable motor, is preferably constructed of steel and is mounted loosely on a transverse shaft 14, which is journaled in suitable bearings 15 of a supporting frame 16. The frame 16, which is rectangular, is constructed of any suitable material, and the hoisting drum consists of a cylinder and terminal heads 17 and 18. The cylinder is provided at its ends with inwardly extending annular flanges 19, fitted against the inner faces of the terminal heads 17 and 18 and preferably secured to the same by rods extending from one end of the drum to the other and piercing the heads 17 and 18 and the flanges 19. The drum may be of any other preferred construction, and the heads are provided with alined bearing openings to receive the transverse shaft 14. The head 17 of the drum is equipped with a hook 17ª for attaching one end of the hoisting rope to the drum. One end of the transverse shaft 14 has keyed or otherwise secured to it a spur gear 20, which meshes with a spur pinion 21 of a counter-shaft 22, journaled in suitable bearings of the frame 16 and equipped at the opposite side thereof with a pulley 23. The pulley 23 is connected by a belt 24 with the driving pulley 25 of the engine 13.

When the engine is in operation, the transverse shaft 14 is continuously rotated, and motion is communicated to the drum from the shaft 14 by a clutch engaging a rim or flange 26 of the drum and comprising a pair of clutch levers 27, preferably constructed of metal and fulcrumed at an intermediate point on a cross head 28 to form inner and outer arms. The rim or flange 26, which is arranged at the outer face of the head 18 of the winding drum 10, is preferably formed integral with the said head 18, and the inner arms of the clutch levers 27 are provided with quarter bends to arrange them at right angles to the planes of the body portion of the outer arms, and are equipped with shoes 29, preferably consisting of wooden blocks, bolted or otherwise secured to the inner arms of the clutch levers 27 and arranged to engage the rim or flange 26 of the drum. The cross head 28, which is keyed or otherwise fixed to the shaft 14, consists of a central hub and opposite arms extending radially of the shaft and provided in their outer portions with slots or bifurcations 30, in which the clutch levers are pivoted by bolts 31. The cross head is provided with inner and outer perforations 32 and 33 to enable the clutch levers to be arranged for engaging the inner face of the flange or rim of the drum 26, as illustrated in Fig. 4 of the drawings, or the outer face of the rim or flange, as shown in Fig. 2. When the clutch levers are arranged to engage the inner face of the rim or flange of the drum, they are protected from the weather and less power is required to operate the hoisting or winding drum.

The outer arms of the clutch levers are provided adjacent their outer ends with quarter bends to arrange their outer terminals in planes at right angles to the body portion of the outer arms of the levers, and the said outer ends of the clutch levers are provided with openings for the reception of adjusting screws 34, connected at their inner ends with a sliding sleeve or member 35 by links 36 and adjustably secured to the clutch levers by nuts 37, arranged at the opposite faces of the angularly bent outer ends of the clutch levers and clamping the same. The links 36 are arranged in pairs and are pivoted at their outer ends by bolts 38 to the opposite faces of the flattened heads 39 of the adjusting screws 34. The inner ends of the links are pivoted by bolts 40 to opposite lugs of the sleeve 35. While one pair of clutch levers is illustrated in the accompanying drawings, a greater number may, if desired, be employed for engaging the rim or flange of the drum. By adjusting the clutch levers through the medium of the screw 34 and the nuts 37 any wear of the parts may be readily taken up and the shoes caused to properly engage the flange or rim of the drum.

The sleeve or member 35, which is slidably interlocked with the shaft by means of a key or feather 41, is provided adjacent to its outer end with an annular groove 42, for the reception of a sectional band 43, provided with opposite pivots 44 and connected by the same to arms 45 of a forked shifting lever 46. The forked shifting lever 46, which extends from the sliding sleeve 35 to one side or end of the frame 16, is pivotally mounted in a suitable support 48 by a bolt 49. The support extends inwardly from one side of the frame and may consist of a strap of iron, or be constructed in any other desired manner. The pivot 49 is located at a point between the ends of the shifting lever, and the outer arm thereof is connected with one end of a friction clutch rope 50, and is arranged between opposite bearings 51 of a bracket 52, secured to the frame 16 and supporting inner and outer guide pulleys 53 and 54. The inner guide pulley receives the friction clutch rope 50 when the shoes of the clutch levers engage the outer face of the rim or flange of the drum, as illustrated in Fig. 2 of the drawings, and the friction clutch rope is guided by the pulley 54 when the clutch levers are arranged at the inner face of the rim or flange of the drum, as shown in Fig. 4. The opposite guide pulleys 53 and 54 are adapted to change the direction of the pull on the levers in order that the friction clutch rope may when pulled cause the clutch to grip the flange or rim of the drum when the clutch levers are in either position. The drum is automatically released by a compression spring 55, disposed on the shaft 14 and interposed between the sliding sleeve or member 35 and an adjustable set collar 56, secured to the shaft 14 and arranged at the outer end of the spring 55. The friction clutch rope 50 extends upwardly from the hoisting device to the outer one of a series of guide pulleys 57, arranged at intervals along the barn, as clearly shown in Fig. 1 of the drawings, and extending from one end thereof to a point above the drive-way 58. The free end of the friction clutch rope extends downwardly from the inner series of the guide pulleys 57 and is adapted to be grasped by the operator from his position upon a load of hay 59, shown in Fig. 1. When the operator pulls upon the friction clutch rope or line, the clutch levers are caused to grip the drum, which then rotates with the transverse shaft 14 to wind up the hoisting rope. This operates to raise the hay fork with its load of hay from the wagon to the carrier, and a continued rotation of the drum moves the carrier along the track to convey the hay fork to the point where the hay is to be discharged. The hay fork is of the ordinary construction and is operated by a trip rope 60, which is held by the operator who holds the trip rope and releases the hay from the fork at the desired point.

The hay fork and the carrier are returned to a point above the load by a reverser or reversing device, equipped with a weight, preferably in the form of a weight receptacle 61, suspended by a rod 62 from a casing 63. The casing 63, which consists of spaced parallel side plates, forms a housing for a pair of rollers 64, and a guide pulley 65, mounted on pivots or spindles 66 and 67, which connect the side plates 63. The upper portions of the side plates are tapered to form a tapered casing, and the wheels 64, which are grooved, are set at an inclination and are adapted to slide upwardly and downwardly along an inclined track 68, consisting of a wire cable, or other suitable means and secured at its upper end to a supporting block or piece 69 and adjustably connected at its lower end with an anchor 70 by a turn buckle 71, or other suitable adjusting device. The block or piece 69 is secured at the gable end of the roof, and the anchor 70 is embedded in the ground at a point beyond the barn, as clearly shown in Fig. 1 of the drawings. In order to enable the track 68 to be arranged at different inclinations, the side plates 63 of the casing are provided at their lower ends with a plurality of perforations 72, arranged in a transverse series at different points along the bottom of the casing and adapted to receive a bolt 73, passing through an eye 74 of the upper end of the rod and adjustably securing the same to the casing. The rod has a lower threaded portion 75, extending through the bottom of the weight receptacle 61 and equipped with upper and lower nuts 76, which clamp the bottom of the receptacle 61. The receptacle 61 is adapted to receive sand, gravel, or other heavy material and enables the weight of the reverser to be adjusted to suit the inclination of the track 68. The reverser is connected with the carrier by a return rope 77, secured at one end to the carrier 5 and extending therefrom to a guide pulley 78, which is suspended by a suitable hanger 79 from the supporting block or piece 69. The other end of the return rope is attached at 80 to the supporting block or piece, and the said return rope is looped at the inclined track to receive the pulley 67. The weight carried by the reverser is adapted to operate through the return rope and actuate the carrier when the clutch releases the hoisting drum.

The operator releases the friction clutch rope to stop the carrier and pulls the trip rope to discharge the load of hay. The reverser then acts automatically to return the carrier and the hay fork to a point above the hay wagon, and the weight of the hay fork causes it to descend to the wagon for another load of hay. In barns of considerable length, the outer portion of the return rope is looped, as illustrated in Fig. 1 of the drawings, to enable the reverser to move the carrier twice the distance traveled by the reverser, and the weight is correspondingly increased to secure this result, but in short barns where the length of the inclined track or guide is equal in length to that of the horizontal track, or the distance the carrier moves along the same, the outer end of the return rope may be attached directly to the guide pulley 65 and less weight will be required for actuating the drum, carrier and the hay fork.

The apparatus is adapted to save time and labor in unloading hay from a wagon into a barn, and is designed particularly for use in connection with the hay distributer, forming the subject-matter of a companion application, filed Aug. 16, 1909, Serial No. 513,157, and when used in conjunction with the said hay distributer, a boy standing on a hay wagon may unassisted unload the hay in an exceedingly short time and deliver the loads carried by the hay fork to the mows of hay on either side of the horizontal carrier track.

Having thus fully described my invention, what I claim as new and desire to secure by Letters Patent, is:—

1. In an apparatus of the class described, the combination with a longitudinal track, and a carrier movable along the track, of a hoisting device located at one end of the longitudinal track and including a hoisting rope connected with the carrier, an inclined track rope located at the other end of the longitudinal track and adapted to be arranged at different inclinations, a return rope connected with the carrier, and a reversing device connected with the return rope and comprising a casing, wheels mounted within the casing and set at an inclination and arranged to run on the inclined track rope, a weight, and means for connecting the weight with the casing below the said wheels and for adjusting the weight toward and from the inclined track to suit the inclination of the same.

2. In an apparatus of the class described, the combination with a longitudinal track, and a carrier movable along the track, of a hoisting device located at one end of the longitudinal track and including a hoisting rope and connected with the carrier, an inclined track located at the other end of the longitudinal track, a return rope connected with the carrier, and a reversing device connected with the return rope and comprising a casing having a transverse series of perforations, wheels mounted within the casing and arranged to run on the inclined track, a weight receptacle, a vertical rod secured at its lower end to the bottom of the weight receptacle and provided at its upper end with an eye, and a fastening device passing through the eye of the rod and adjustably mounted on the casing by the said perforations.

3. In an apparatus of the class described, the combination with a longitudinal track, and a carrier movable along the same, of a hoisting device arranged at one end of the track and including a hoisting drum, a hoisting rope connected with the carrier and with the drum, a motor, a friction clutch for connecting the drum with the motor having a shifting lever, a friction clutch rope connected with the shifting lever, a series of guide pulleys extending longitudinally of the track and receiving the friction clutch rope and supporting the same, and a reversing device for automatically actuating the carrier to move the same in the opposite direction from the hoisting device.

4. An apparatus of the class described comprising a longitudinal track arranged within a barn, a carrier movable along the track, a hoisting device including a hoisting drum arranged outside of the barn, a hoisting rope connected with the carrier and with the drum, a motor also located outside of the barn, a clutch for connecting the drum with the motor having a shifting lever, a clutch rope connected with the shifting lever and extending to the load, and a reversing device for moving the carrier in the opposite direction from the hoisting device.

5. An apparatus of the class described comprising a longitudinal track arranged within a barn, a carrier movable along the track, a hoisting device including a hoisting drum arranged outside of the barn, a hoisting rope connected with the carrier and with the drum, a motor also located outside of the barn, a clutch for connecting the drum with the motor having a shifting lever, a clutch rope connected with the shiftable lever and extending to the load, an inclined track rope also located outside of the barn and arranged at one end of the longitudinal track and extending downwardly and outwardly to the ground, a return rope connected with the carrier and extending to the inclined track rope, and a reversing device slidable upwardly and downwardly on the inclined track rope and connected with the return rope for automatically actuating the carrier to move the same in the opposite direction from the hoisting rope.

In testimony, that I claim the foregoing as my own, I have hereto affixed my signature in the presence of two witnesses.

NICHOLAS C. MILLER.

Witnesses:
WILLIAM N. MILLER,
V. T. WILLIAMS.

Copies of this patent may be obtained for five cents each, by addressing the "Commissioner of Patents, Washington, D. C."